United States Patent
Zhang et al.

(10) Patent No.: US 11,396,927 B2
(45) Date of Patent: Jul. 26, 2022

(54) SPEED REDUCER, POWER SYSTEM, STRADDLE-TYPE RAIL TRAIN, AND RAIL TRANSIT SYSTEM

(71) Applicant: BYD COMPANY LIMITED, Shenzhen (CN)

(72) Inventors: Jintao Zhang, Shenzhen (CN); Lin Ren, Shenzhen (CN); Daolin Li, Shenzhen (CN); Xin Zhang, Shenzhen (CN); Jianjian Yuan, Shenzhen (CN); Cailin Fu, Shenzhen (CN); Hongbin Luo, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 562 days.

(21) Appl. No.: 16/334,682

(22) PCT Filed: Feb. 28, 2017

(86) PCT No.: PCT/CN2017/075223
§ 371 (c)(1),
(2) Date: Mar. 19, 2019

(87) PCT Pub. No.: WO2018/054016
PCT Pub. Date: Mar. 29, 2018

(65) Prior Publication Data
US 2021/0285519 A1    Sep. 16, 2021

(30) Foreign Application Priority Data

Sep. 21, 2016  (CN) .......................... 201610840409.3
Sep. 21, 2016  (CN) .......................... 201610840623.9

(51) Int. Cl.
*F16H 1/20*   (2006.01)
*F16H 1/28*   (2006.01)
(Continued)

(52) U.S. Cl.
CPC .......... *F16H 1/227* (2013.01); *F16H 57/021* (2013.01); *F16H 57/0415* (2013.01);
(Continued)

(58) Field of Classification Search
CPC .......... F16H 1/227; F16H 1/28; F16H 57/021; F16H 57/045; F16H 2057/02034;
(Continued)

(56) References Cited

U.S. PATENT DOCUMENTS 3,161,249 A * 12/1964 Zuppiger ................ B60T 1/062
                                                         180/10
3,783,795 A *  1/1974 Helmer .................... B60L 9/30
                                                         105/61
(Continued)

FOREIGN PATENT DOCUMENTS

CN        101830172 A       9/2010
CN        102139628 A       8/2011
(Continued)

OTHER PUBLICATIONS

Machine translation of CN 101830172 A obtained on Jul. 20, 2021.*
(Continued)

*Primary Examiner* — Adam D Rogers
(74) *Attorney, Agent, or Firm* — Anova Law Group, PLLC (57) ABSTRACT

A speed reducer, a power system, a straddle-type rail train, and a rail transport system are disclosed. The speed reducer includes: a box body; a speed-reducing mechanism, disposed in the box body; and a support shaft, a first end of the support shaft being supported on the box body, and a second end of the support shaft being connected to a high-speed end of the speed-reducing mechanism. The speed reducer according to the present disclosure achieves a more stable (Continued)

connection between a drive shaft and a speed-reducing mechanism and a more stable power transmission.

13 Claims, 5 Drawing Sheets

(51) Int. Cl.
    *F16H 57/02*     (2012.01)
    *F16H 57/04*     (2010.01)
    *F16H 1/22*     (2006.01)
    *F16H 57/021*     (2012.01)
    *H02K 7/116*     (2006.01)
    *B61H 5/00*     (2006.01)

(52) U.S. Cl.
    CPC ............... *H02K 7/116* (2013.01); *B61H 5/00* (2013.01); *F16H 1/28* (2013.01); *F16H 2057/02034* (2013.01)

(58) Field of Classification Search
    CPC .......... F16H 2057/02052; H02K 7/102; H02K 7/116; B61B 13/02; B61H 5/00; B60L 2200/26
    See application file for complete search history.

(56) References Cited

U.S. PATENT DOCUMENTS

| | | | | |
|---|---|---|---|---|
| 4,799,564 A * | 1/1989 | Iijima | ................. | B60K 7/0007 180/65.51 |
| 5,251,878 A * | 10/1993 | Mann | ................. | B66D 1/22 254/344 |
| 6,006,870 A | 12/1999 | Gazyakan et al. | | |
| 6,139,464 A * | 10/2000 | Roske | ................. | B60K 7/0007 180/65.6 |
| 6,540,632 B1 * | 4/2003 | Wendl | ................. | B60K 7/0007 180/65.51 |
| 6,749,532 B2 * | 6/2004 | Wachauer | ............. | H02K 7/116 475/5 |
| 6,811,514 B2 | 11/2004 | Bowman | | |
| 8,602,145 B2 * | 12/2013 | Su | ................. | B60K 17/046 180/65.51 |
| 10,197,152 B2 * | 2/2019 | Volkmer | ............... | B60B 27/001 |
| 2015/0273940 A1 * | 10/2015 | Forrest | ..................... | F16H 1/46 475/300 |

FOREIGN PATENT DOCUMENTS

| | | |
|---|---|---|
| CN | 102555773 A | 7/2012 |
| CN | 102629800 A | 8/2012 |
| CN | 205059062 U | 3/2016 |
| CN | 105905120 A | 8/2016 |
| JP | H07293644 A | 11/1995 |
| JP | 2013126334 A | 6/2013 |
| JP | 2015121255 A | 7/2015 |

OTHER PUBLICATIONS

Machine translation of CN 102139628 A obtained on Jan. 13, 2022.*

The World Intellectual Property Organization (WIPO) International Search Report for PCT/CN2017/075223 dated Jun. 15, 2017 6 Pages.

* cited by examiner

FIG. 5 cooling water passage

SPEED REDUCER, POWER SYSTEM, STRADDLE-TYPE RAIL TRAIN, AND RAIL TRANSIT SYSTEM

CROSS-REFERENCE TO RELATED APPLICATIONS

This application is a national phase entry under 35 U.S.C. § 371 of International Application No. PCT/CN2017/075223, filed on Feb. 28, 2017, which claims a priority to and benefits of Chinese Patent Application Serial No. 201610840623.9, filed on Sep. 21, 2016, and Chinese Patent Application Serial No. 201610840409.3, filed on Sep. 21, 2016, the entire content of all of which is incorporated herein by reference.

FIELD

The present disclosure relates to the technical field of vehicles and, in particular, to a speed reducer, a power system, a straddle-type rail train, and a rail transit system.

BACKGROUND

In the related art, the connection between a drive shaft and a speed-reducing mechanism is unstable, and a force transmitted by the speed-reducing mechanism is directly applied to the drive shaft, thereby causing phenomena that the drive shaft is easily damaged and the entire vehicle is prone to unstable operation.

SUMMARY

The present disclosure aims at resolving one of technical problems in related technologies at least to some extent. In view of this, an objective of the present disclosure is to provide a speed reducer, which achieves a more stable connection between a drive shaft and a speed-reducing mechanism and a more stable power transmission.

Another objective of the present disclosure is to provide a power system having the foregoing speed reducer.

Yet another objective of the present disclosure is to provide a straddle-type rail train having the foregoing power system.

A further objective of the present disclosure is to provide a rail transit system having the foregoing straddle-type rail train.

The speed reducer according to the present disclosure includes: a box body; a speed-reducing mechanism, disposed in the box body; and a support shaft, a first end of the support shaft being supported on the box body, and a second end of the support shaft being connected to a high-speed end of the speed-reducing mechanism.

Using the speed reducer according to the present invention, since a drive member is not directly connected to a high-speed end of a speed-reducing mechanism, but is connected to the speed-reducing mechanism through a support shaft, the support shaft can support the speed-reducing mechanism and the drive member, the connection between the drive member and the speed-reducing mechanism is more stable, and the power transmission is more stable.

In addition, the split type transmission can also disperse a force transmitted from the speed-reducing mechanism to the drive member to prevent the drive member from being swayed or even damaged by an excessive force, thereby effectively protecting the drive member.

Furthermore, the speed reducer according to the present disclosure may also have the following additional technical features:

According to an embodiment of the present disclosure, the speed reducer further includes: a rim connecting member, the rim connecting member being at least partially disposed in the box body and connected to a low speed end of the speed-reducing mechanism.

According to an embodiment of the present disclosure, the speed reducer further includes: a motor mounting base, provided with a cooling water passage.

According to an embodiment of the present disclosure, the speed-reducing mechanism includes: a primary speed-reducing component and a secondary speed-reducing component, the primary speed-reducing component being connected to the second end of the support shaft, and the secondary speed-reducing component being connected to the rim connecting member.

According to an embodiment of the present disclosure, the primary speed-reducing component includes: a primary speed-reducing driving gear and a primary speed-reducing driven gear, the primary speed-reducing driving gear being connected to the second end of the support shaft, and the primary speed-reducing driven gear being meshed with the primary speed-reducing driving gear.

According to an embodiment of the present disclosure, the secondary speed-reducing component includes: a secondary speed-reducing driving gear and a secondary speed-reducing driven gear, the secondary speed-reducing driving gear and the primary speed-reducing driven gear being coaxially fixed, the secondary speed-reducing driven gear being meshed with the secondary speed-reducing driving gear, and the secondary speed-reducing driven gear being connected to the rim connecting member.

According to an embodiment of the present disclosure, there is a plurality of primary speed-reducing driven gears supported on the box body.

According to an embodiment of the present disclosure, the secondary speed-reducing driven gear is a ring gear, and the secondary speed-reducing driven gear and the rim connecting member are coaxially fixed.

According to an embodiment of the present disclosure, the box body includes: a housing portion and a sleeve portion, the sleeve portion being disposed in the housing portion.

According to an embodiment of the present disclosure, the primary speed-reducing driven gear is supported between the housing portion and the sleeve portion through a first bearing set.

According to an embodiment of the present disclosure, the rim connecting member is supported on the sleeve portion through a second bearing set.

According to an embodiment of the present disclosure, the first end of the support shaft is supported on the sleeve portion through a third bearing set.

According to an embodiment of the present disclosure, the box body further includes: an end cover, disposed on an end face of the rim connecting member.

According to an embodiment of the present disclosure, the box body further includes: an oil seal, disposed on the housing portion and used to seal a gap between the housing portion and the rim connecting member.

A power system according to the present disclosure includes the foregoing speed reducer, a motor and a brake. The motor is disposed on the box body and provided with a motor shaft, the motor shaft being connected to the second end of the support shaft. The brake is mounted on the motor and in driving connection with the motor, and the brake achieves a motor braking function.

According to an embodiment of the present disclosure, an end face of the second end of the support shaft is depressed inward to form a spline groove, the motor shaft stretches into the spline groove to be meshed with the second end of the support shaft, a peripheral surface of the second end of the support shaft is meshed with the high-speed end of the speed-reducing mechanism, or a peripheral surface of the second end of the support shaft is fixed to the high-speed end of the speed-reducing mechanism.

Since the power system according to the present disclosure is provided with the foregoing speed reducer, the power system is more stable in operation, more stable in transmission and longer in service life.

A straddle-type rail train according to the present disclosure includes the foregoing power system. Since the straddle-type rail train according to the present disclosure is provided with the foregoing power system, the straddle-type rail train is more stable in operation and safer to drive.

A rail transport system according to the present disclosure includes the foregoing straddle-type rail train. Since the rail transport system according to the present disclosure is provided with the foregoing straddle-type rail train, the rail transport system is more stable, and can effectively protect the personal safety of passengers.

Additional aspects and advantages of embodiments of the disclosure will be given in part in the following descriptions, become apparent in part from the following descriptions, or be learned from the practice of the embodiments of the disclosure.

BRIEF DESCRIPTION OF THE DRAWINGS

The foregoing and/or additional aspects and advantages of the present disclosure become obvious and easily understood in descriptions of the embodiments with reference to the following accompanying drawings.

Drawing reference characters: power system 1000, speed reducer 100, box body 110, housing portion 111, sleeve portion 112, end cover 113, oil seal 114, speed-reducing mechanism 120, primary speed-reducing driving gear 121, primary speed-reducing driven gear 122, secondary speed-reducing driving gear 123, secondary speed-reducing driven gear 124, support shaft 130, rim connecting member 140, first bearing set 160, second bearing set 170, third bearing set 180, motor mounting base 190, motor mounting base body 191, water passage cover plate 192, water pipe connecting member 193, motor 200, brake 300.

DETAILED DESCRIPTION

The embodiments of the present disclosure are described in detail below. Examples of the embodiments are illustrated in the accompanying drawings. The embodiments described below with reference to the accompanying drawings are exemplary, and are used for explaining rather than limiting the present disclosure.

In the description of the present disclosure, it should be understood that, orientations or position relationships indicated by terms such as "center", "longitudinal", "transverse", "length", "width", "thickness", "up", "down", "front", "back", "left", "right", "vertical", "horizontal", "top", "bottom", "inner", "outer", "clockwise", "counterclockwise", "axial", "radial", and "circumferential" are orientations or position relationship shown based on the accompanying drawings, and are merely used for describing the present disclosure and simplifying the description, rather than indicating or implying that the apparatus or element should have a particular orientation or be constructed and operated in a particular orientation, and therefore, should not be construed as a limitation on the present disclosure.

In addition, terms "first" and "second" are used only for description purposes, and shall not be understood as indicating or suggesting relative importance or implicitly indicating a quantity of indicated technical features. Therefore, features defined by "first" and "second" may explicitly or implicitly include at least one feature. In the description of the present disclosure, unless otherwise specifically limited, "multiple" means at least two, for example, two or three.

In the present disclosure, it should be noted that unless otherwise clearly specified and limited, the terms "mounted", "connected", "connection", and "fixed" should be understood in a broad sense. For example, a connection may be a fixed connection, a detachable connection, or an integral connection; may be a mechanical connection or an electrical connection, or mutual communication; may be a direct connection or an indirect connection by means of an intermediate medium; or may be internal communication between two elements or interaction relationship between two elements, unless otherwise clearly limited. A person of ordinary skill in the art may understand specific meanings of the foregoing terms in the present disclosure according to a specific situation.

A speed reducer 100 according to an embodiment of the present disclosure will be described in detail below with reference to FIG. 1 to FIG. 10.

The speed reducer 100 according to an embodiment of the present disclosure may include a box body 110, a speed-reducing mechanism 120, and a support shaft 130.

The box body 110 can define an accommodating space, and the speed-reducing mechanism 120 and the support shaft 130 can be disposed in the box body 110.

Figure 3:
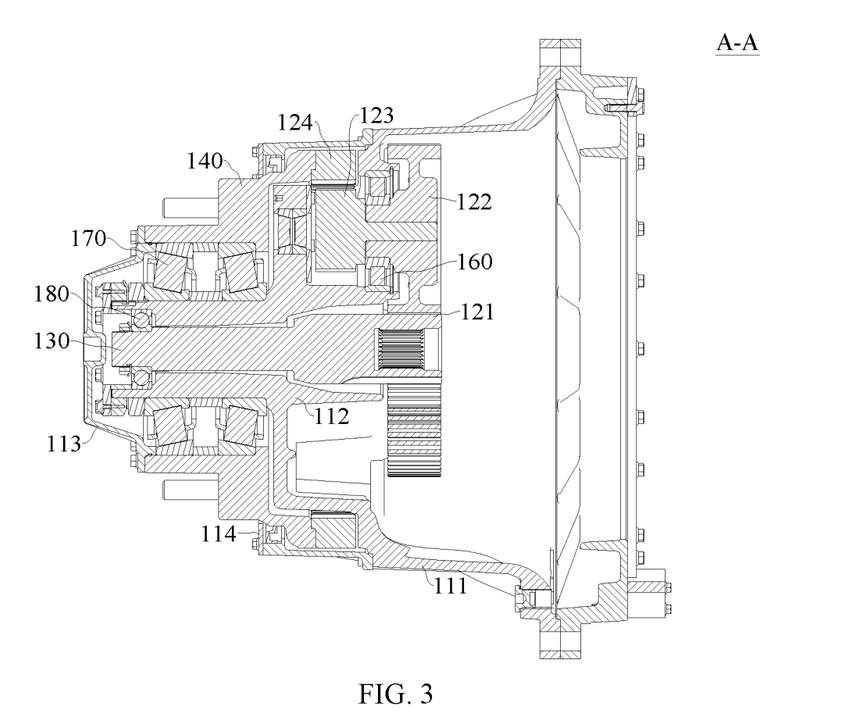
FIG. 3 is a sectional view of FIG. 2 along an A-A direction.
Figure 4:
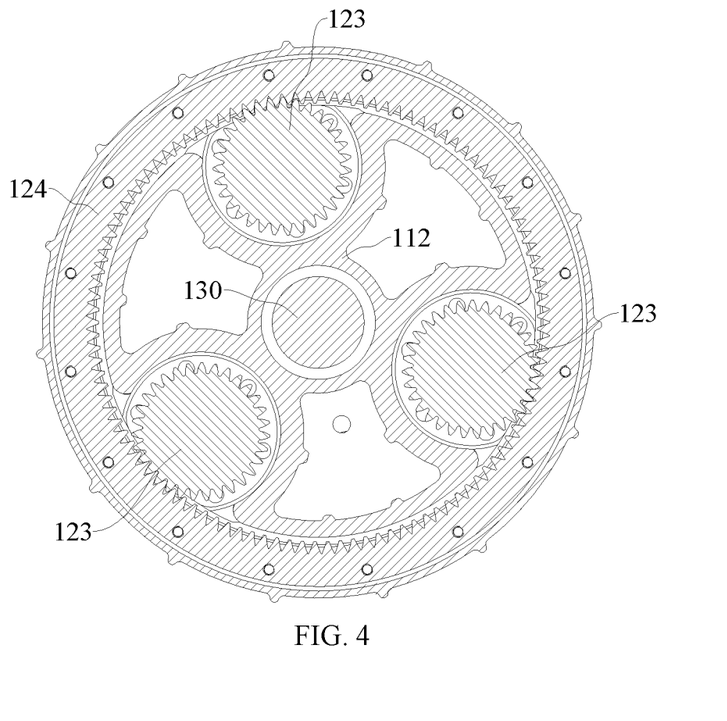
FIG. 4 is a sectional view of a speed reducer according to an embodiment of the present disclosure.
Figure 5:
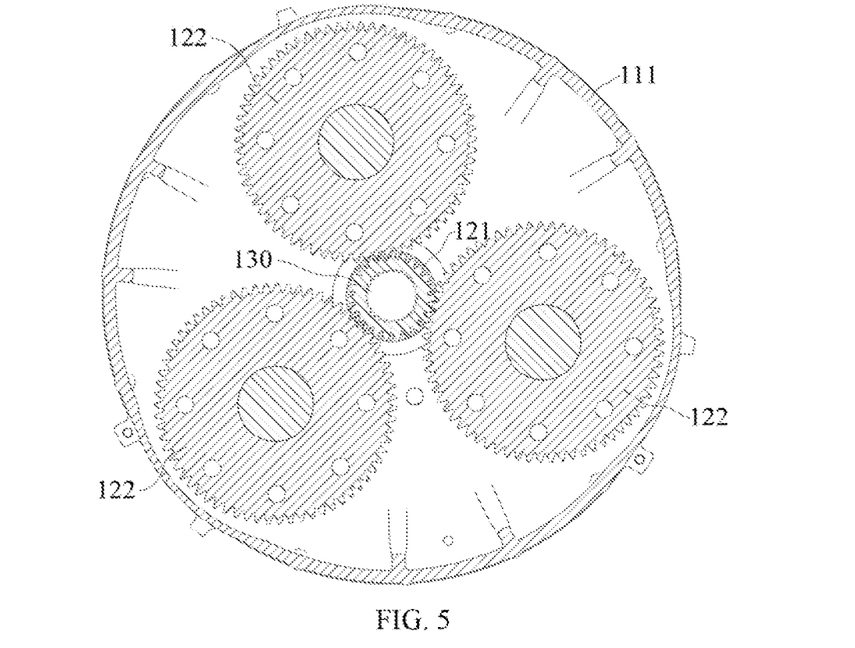
FIG. 5 is another sectional view of a speed reducer according to an embodiment of the present disclosure.

As shown in FIG. 3, a first end of the support shaft 130 is supported on the box body 110, and a second end of the support shaft 130 is connected to a high-speed end of the speed-reducing mechanism 120 and can support the high-speed end of the speed-reducing mechanism.

That is to say, a drive member does not need to be in direct contact with the high-speed end of the speed-reducing mechanism 120, but first transmits power to the second end of the support shaft 130, and the second end of the support shaft 130 is connected between the high-speed end of the speed-reducing mechanism 120 and the drive member.

Specifically, an end face of the second end of the support shaft 130 is depressed inward to form a groove, the groove may be a spline groove, and a drive shaft of the drive member can stretch into the spline groove to be meshed with the second end of the support shaft.

A peripheral surface of the second end of the support shaft 130 may be provided with gear teeth, and may be meshed with the high-speed end of the speed-reducing mechanism 120. Of course, the high-speed end of the speed-reducing mechanism 120 may also be directly fixed to the peripheral surface of the second end of the support shaft 130, thereby connecting the second end of the support shaft 130 to the high-speed end of the speed-reducing mechanism.

The drive shaft rotates at a high-speed and drives the support shaft 130 to rotate at a high-speed. Since the second end of the support shaft 130 cooperates with the drive shaft and the high-speed end of the speed-reducing mechanism 120 respectively, the drive shaft can indirectly drive the high-speed end of the speed-reducing mechanism.

The first end of the support shaft 130 is supported on the box body 110, and the second end of the support shaft 130 is meshed with the drive shaft and supports the high-speed end of the speed-reducing mechanism 120. Thus, the drive member does not need to be directly connected to the high-speed end of the speed-reducing mechanism 120, but is connected to the speed-reducing mechanism 120 through the support shaft 130, the support shaft 130 can support the speed-reducing mechanism 120 and the drive member, the connection between the drive member and the speed-reducing mechanism 120 is more stable, and the power transmission is more stable.

In addition, the split type transmission may also disperse a force transmitted from the speed-reducing mechanism 120 to the drive member (for example, the drive shaft) to prevent the drive member from being swayed or even damaged by an excessive force, thereby effectively protecting the drive member.

The speed reducer 100 further includes a rim connecting member 140, the rim connecting member 140 being connected to a low speed end of the speed-reducing mechanism 120, and the rim connecting member 140 being at least partially disposed in the box body 110. In other words, a portion of the rim connecting member 140 is disposed inside the box body 110, and another portion of the rim connecting member 140 is disposed outside the box body 110. The rim connecting member 140 is a power output end, and the rim connecting member 140 can drive a wheel to rotate.

In some embodiments of the present disclosure, as shown in FIG. 1 and FIGS. 3-5, the speed-reducing mechanism 120 includes a primary speed-reducing component and a secondary speed-reducing component, the primary speed-reducing component being connected to the second end of the support shaft 130, and the secondary speed-reducing component being connected to the rim connecting member 140.

The power of the drive member is first transmitted to the support shaft 130, then transmitted to the primary speed-reducing component and the secondary speed-reducing component in sequence, and finally output by the rim connecting member 140. After speed reduction via the primary speed-reducing component and the secondary speed-reducing component, the output speed of the rim connecting member 140 can meet requirements.

It can be understood that an end close to the primary speed-reducing component is the high-speed end, an end close to the secondary speed-reducing component is the low speed end, and the primary speed-reducing component and the secondary speed-reducing component are connected.

Specifically, the primary speed-reducing component includes a primary speed-reducing driving gear 121 and a primary speed-reducing driven gear 122, the primary speed-reducing driving gear 121 being connected to the second end of the support shaft 130, and the primary speed-reducing driven gear 122 being meshed with the primary speed-reducing driving gear 121.

The primary speed-reducing driving gear 121 can be fixed to the second end of the support shaft 130, and the primary speed-reducing driving gear 121 and the support shaft 130 coaxially rotate. Optionally, the primary speed-reducing driving gear 121 and the second end of the support shaft 130 are integrally formed. That is, the primary speed-reducing driving gear 121 can be formed on the second end of the support shaft 130.

In some embodiments of the present disclosure, the primary speed-reducing driving gear 121 is formed on the peripheral surface of the second end of the support shaft 130.

The secondary speed-reducing component includes a secondary speed-reducing driving gear 123 and a secondary speed-reducing driven gear 124, the secondary speed-reducing driving gear 123 and the primary speed-reducing driven gear 122 being coaxially fixed, and the secondary speed-reducing driven gear 124 being meshed with the secondary speed-reducing driving gear 123. The secondary speed-reducing driven gear 124 is connected to the rim connecting member 140, and the secondary speed-reducing driven gear 124 and the rim connecting member 140 may be coaxially fixed.

It can be understood that the diameter of the primary speed-reducing driving gear 121 is less than the diameter of the primary speed-reducing driven gear 122, and the diameter of the secondary speed-reducing driving gear 123 is less than the diameter of the secondary speed-reducing driven gear 124. Preferably, the diameter of the secondary speed-reducing driving gear 123 is less than the diameter of the primary speed-reducing driven gear 122, and therefore the speed-reducing capability of the speed-reducing mechanism 120 can be further enhanced.

In some embodiments of the present disclosure, there is a plurality of primary speed-reducing driven gears 122 (in a specific example of the present disclosure, there are three primary speed-reducing driven gears 122), and the primary speed-reducing driven gears 122 are supported on the box body 110. Since the primary speed-reducing driven gear 122 is supported on the box body 110, the primary speed-reducing driven gear 122 may only rotate, but cannot revolve in the circumferential direction of the box body.

The secondary speed-reducing driven gear 124 and the rim connecting member 140 are coaxially fixed, and therefore the secondary speed-reducing driven gear 124 may drive the rim connecting member 140 to coaxially rotate. The secondary speed-reducing driven gear 124 is a ring gear, and the secondary speed-reducing driving gear 123 is located on an inner side of the secondary speed-reducing driven gear 124 and meshed with the secondary speed-reducing driven gear 124.

It can be understood that, since there is a plurality of primary speed-reducing driven gears 122, there is also a plurality of secondary speed-reducing driving gears 123, the secondary speed-reducing driving gears 123 and the primary speed-reducing driven gears 122 are in one to one correspondence, and the primary speed-reducing driven gears 122 are also disposed on the inner side of the secondary speed-reducing driven gear 124.

Figure 1:
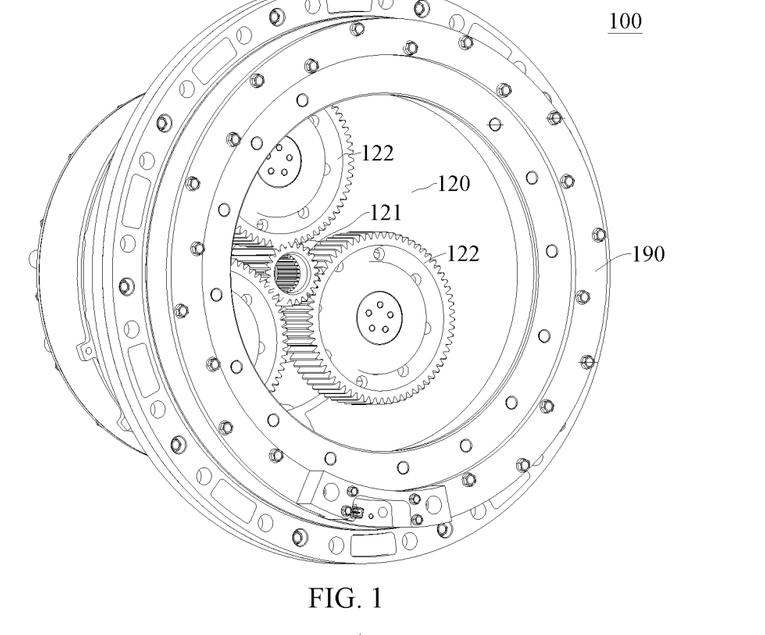
FIG. 1 is a schematic view of a speed reducer according to an embodiment of the present disclosure.
Figure 2:
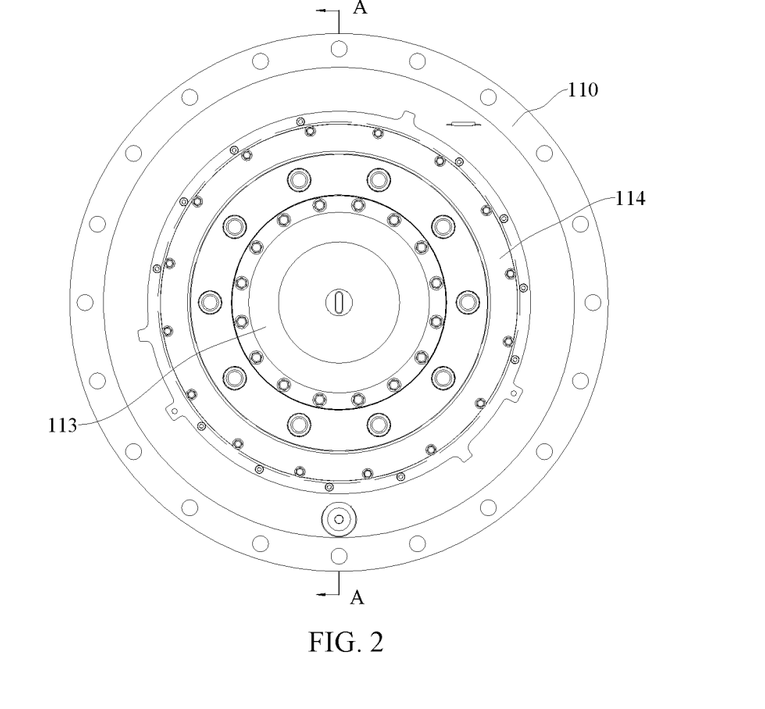
FIG. 2 is a front view of a speed reducer according to an embodiment of the present disclosure.

In some embodiments of the present disclosure, as shown in FIGS. 1-3, the box body 110 includes a housing portion 111 and a sleeve portion 112, the sleeve portion 112 being disposed inside the housing portion 111, where the support shaft 130 may be disposed in the sleeve portion 112 and may rotate relative to the sleeve portion 112.

As shown in FIG. 3, the primary speed-reducing driven gear 122 is supported between the housing portion 111 and the sleeve portion 112 through a first bearing set 160. Specifically, the primary speed-reducing driven gear 122 is provided with a neck journal, an inner ring of the first bearing set 160 is fixed to the neck journal, an outer ring of the first bearing set 160 is fixed to the housing portion 111 and the sleeve portion 112, and therefore the primary speed-reducing driven gear 122 can rotate relative to the box body 110. It can be understood that the number of bearings in the first bearing set 160 is not specifically limited, and there may be two or more bearings in the first bearing set 160.

Since there is a plurality of primary speed-reducing driven gears 122, the support shaft 130 cooperates with the plurality of primary speed-reducing driven gears 122 uniformly distributed, which can ensure a stable stress on the support shaft 130 and an average torque distribution, reduce loads on the first bearing set 160 and prolong the service life of the first bearing set 160.

The rim connecting member 140 is supported on the sleeve portion 112 through a second bearing set 170, and therefore when the secondary speed-reducing driven gear 124 transmits power to the rim connecting member 140, the rim connecting member 140 can rotate relative to the box body 110, thus ensuring the stable operation of a wheel.

In a specific example of the present disclosure, the second bearing set 170 includes two cylindrical roller bearings, inner rings of the cylindrical roller bearings are fixed to the sleeve portion 112, outer rings of the cylindrical roller bearings are fixed to the rim connecting member 140, and the two cylindrical roller bearings are spaced apart.

Further, the first end of the support shaft 130 is supported on the sleeve portion 112 through a third bearing set 180. For example, the first end of the support shaft 130 may be supported on the sleeve portion 112 through a deep groove ball bearing, an outer ring of the deep groove ball bearing is fixed to the sleeve portion 112, and an inner ring of the deep groove ball bearing is fixed to the first end of the support shaft 130.

The primary speed-reducing driving gear 121 is disposed on the support shaft 130, and the support shaft 130 can rotate relative to the box body 110. The primary speed-reducing driven gear 122 is supported on the box body 110, and the secondary speed-reducing driving gear 123 and the primary speed-reducing driven gear 122 are coaxially fixed. The secondary speed-reducing driven gear 124 is connected to the rim connecting member 140, and the rim connecting member 140 is supported on the sleeve portion 112. Therefore, in the speed-reducing mechanism 120, the primary speed-reducing driving gear 121, the primary speed-reducing driven gear 122, the secondary speed-reducing driving gear 123 and the secondary speed-reducing driven gear 124 all rotate, but do not involve revolution, so the speed-reducing mechanism 120 operates more stably and reliably.

In some embodiments of the present invention, a spline groove is provided in the second end of the support shaft 130, the drive shaft can stretch into the spline groove and be meshed with a spline thereon, and the drive shaft can thus transmit power to the support shaft 130.

Figure 6:
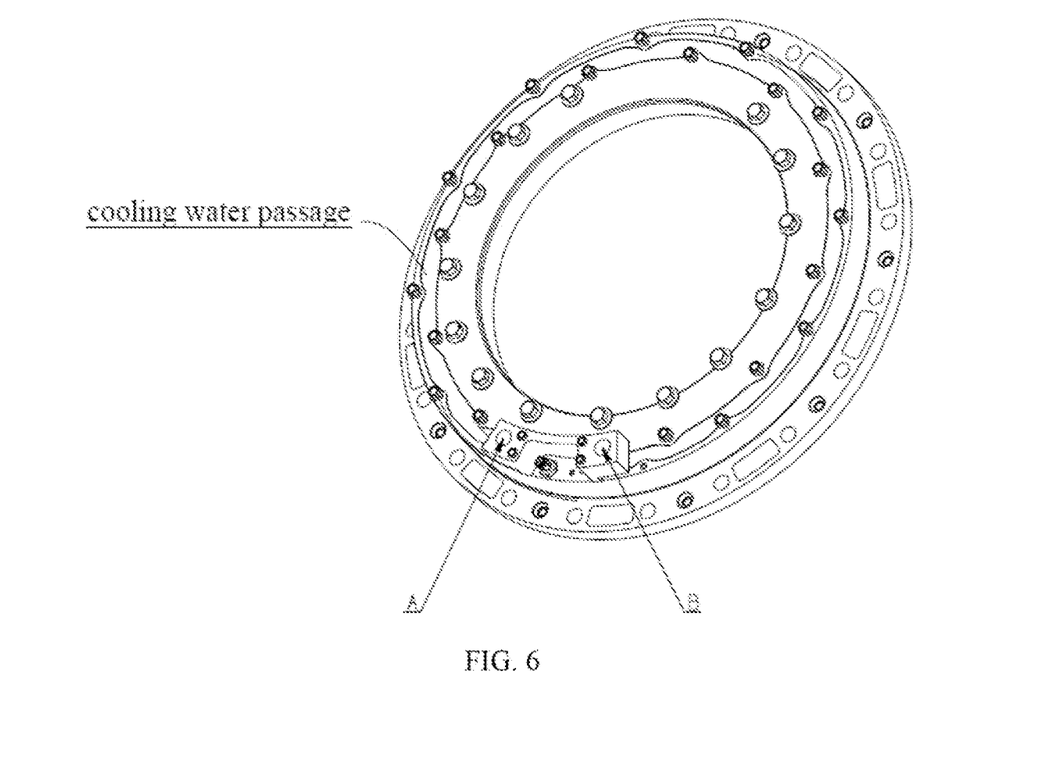
FIG. 6 is a schematic view of a motor mounting base according to an embodiment of the present disclosure.
Figure 7:
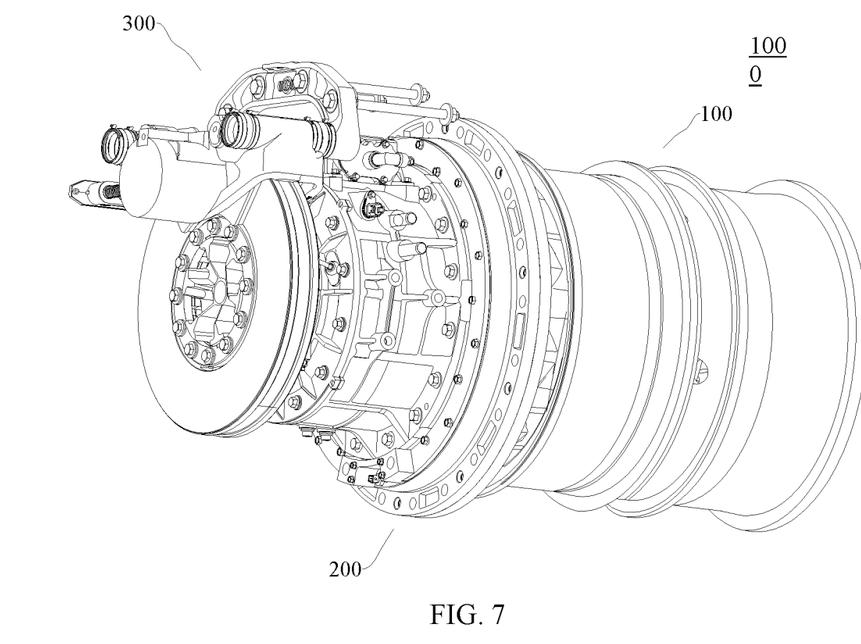
FIG. 7 is a schematic view of a power system according to an embodiment of the present disclosure.
Figure 8:
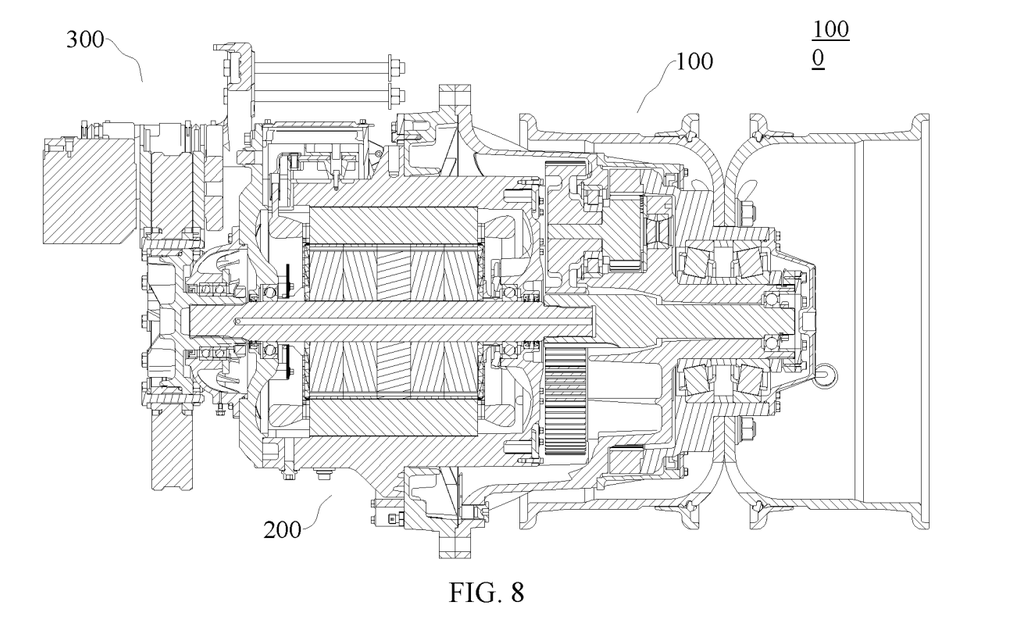
FIG. 8 is a sectional view of a power system according to an embodiment of the present disclosure.
Figure 9:
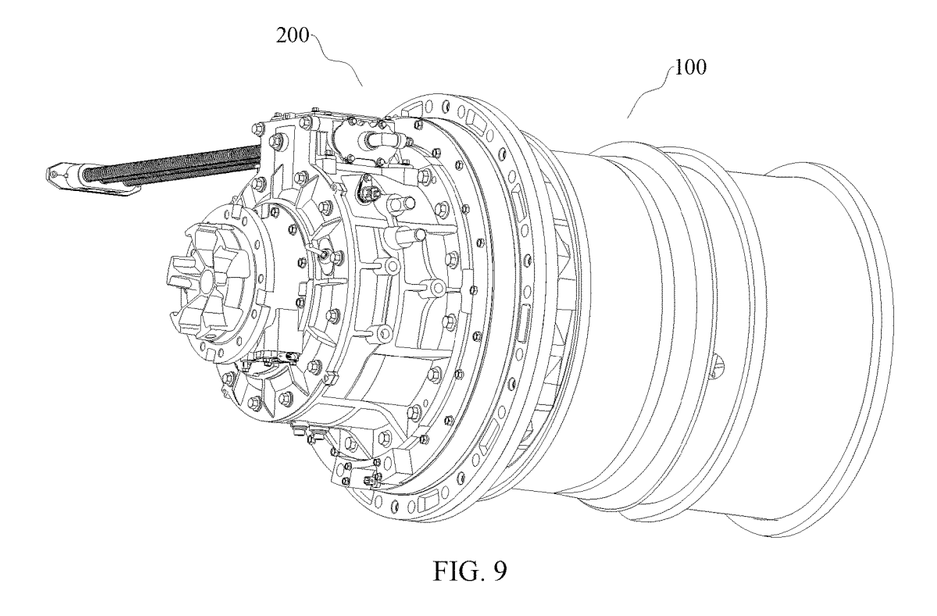
FIG. 9 is a schematic view illustrating cooperation of a speed reducer and a motor according to an embodiment of the present disclosure.
Figure 10:
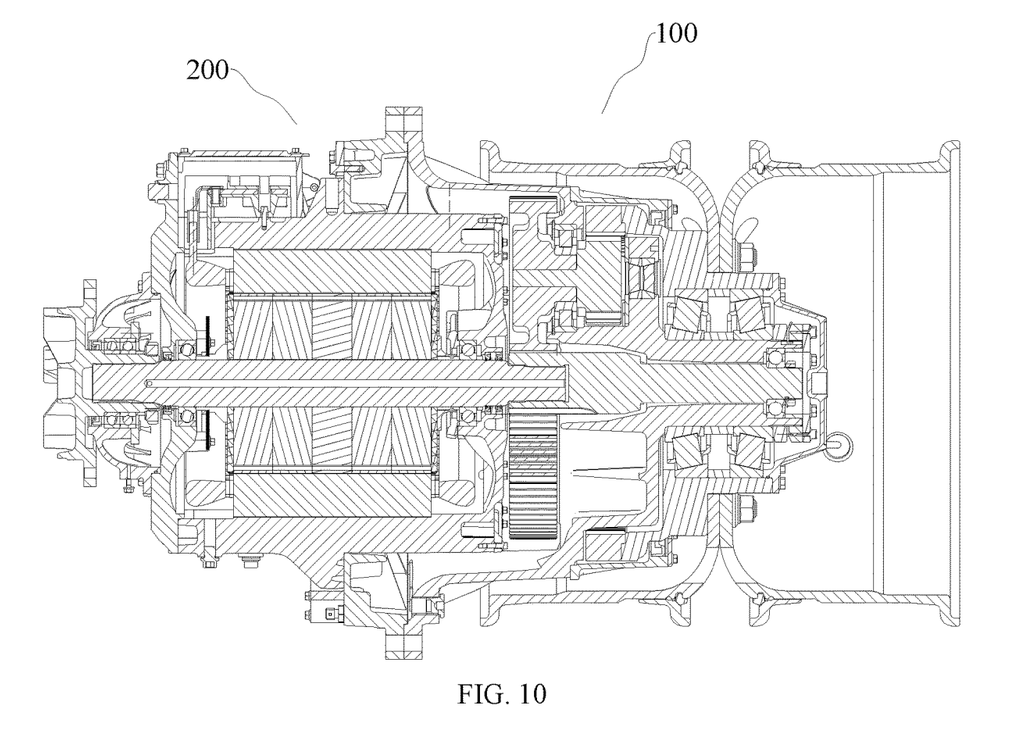
FIG. 10 is a sectional view illustrating cooperation of a speed reducer and a motor according to an embodiment of the present disclosure.

As shown in FIG. 1 and FIG. 6, the speed reducer 100 further includes a motor mounting base 190, the motor mounting base 190 may be mounted on the box body 110, and the motor mounting base 190 is used for being connected to a motor and a bogie. The motor mounting base 190 is further provided with a cooling water passage, and the motor mounting base 190 is provided with a water inlet and a water outlet communicating with the cooling water passage.

The motor mounting base 190 includes a motor mounting base body 191 and a water passage cover plate 192, and the motor mounting base body 191 and the water passage cover plate 192 define the cooling water passage. The water passage cover plate 192 is provided with a water pipe connecting member 193, the water pipe connecting member 193 is provided with a water inlet and a water outlet, and the water inlet and the water outlet are connected to a water inlet pipe and a water outlet pipe respectively.

Of course, it can be understood that the motor mounting base 190 is not limited to mounting a motor, but may also mount other types of drive members.

The speed reducer 100 according to the embodiment of the present disclosure adopts an oil cooling+water cooling mode, cooling water in the cooling water passage can cool lubricating oil in the box body 110 to prevent from affecting the lubricating effect due to over-high temperature of the lubricating oil, and the lubricating oil can lubricate and cool parts such as bearings and gears to prolong the service life of the parts such as the bearings and the gears.

As shown in FIGS. 2-3, the box body 110 further includes an end cover 113 and an oil seal 114, the end cover 113 is disposed on an end face of the rim connecting member 140, and the oil seal 114 is disposed on the housing portion 111 and used to seal a gap between the housing portion 111 and the rim connecting member 140.

The end cover 113, the rim connecting member 140, the oil seal 114 and the box body 110 can form a relatively closed chamber in which the speed-reducing mechanism 120 is disposed. The chamber has lubricating oil for lubricating and cooling the speed-reducing mechanism 120, the bearings, etc. The end cover 113 and the oil seal 114 can ensure that the chamber is relatively closed, thereby avoiding leakage of the lubricating oil from the chamber.

A power system according to an embodiment of the present disclosure is described below.

As shown in FIGS. 1-10, the power system according to the embodiment of the present disclosure includes the speed reducer 100 in the foregoing embodiment, a drive member (for example, a motor 200) and a brake 300. The motor 200 is disposed on the box body 110, and the motor 200 is connected to the support shaft 130 of the speed reducer 100. The motor 200 has a drive shaft (motor shaft), the motor shaft being connected to the second end of the support shaft. The brake 300 is mounted on the motor 200 and in driving connection with the motor 200, and the brake 300 can achieve a braking function on the motor 200.

That is to say, the motor shaft does not need to be in direct contact with the high-speed end of the speed-reducing mechanism 120, but first transmits power to the second end of the support shaft 130, and the second end of the support shaft 130 is connected between the high-speed end of the speed-reducing mechanism 120 and the motor shaft.

Specifically, an end face of the second end of the support shaft 130 is depressed inward to form a groove, the groove may be a spline groove, and the motor shaft can stretch into the spline groove to be meshed with the second end of the support shaft.

The motor shaft rotates at a high-speed and drives the support shaft 130 to rotate at a high-speed. Since the second end of the support shaft 130 cooperates with the motor shaft and the high-speed end of the speed-reducing mechanism 120 respectively, the motor shaft can indirectly drive the high-speed end of the speed-reducing mechanism.

The first end of the support shaft 130 is supported on the box body 110, and the second end of the support shaft 130 is meshed with the motor shaft and supports the high-speed end of the speed-reducing mechanism 120. Thus, the motor shaft does not need to be directly connected to the high-speed end of the speed-reducing mechanism 120, but is connected to the speed-reducing mechanism 120 through the support shaft 130. The support shaft 130 can support the speed-reducing mechanism 120 and the motor shaft, the connection between the motor shaft and the speed-reducing mechanism 120 is more stable, and the power transmission is more stable.

The split type transmission may also disperse a force transmitted from the speed-reducing mechanism 120 to the motor shaft to prevent the motor shaft from being swayed or even damaged by an excessive force, thereby effectively protecting the motor 200 and the motor shaft.

The power of the motor is first transmitted to the support shaft 130, then transmitted to the primary speed-reducing component and the secondary speed-reducing component in sequence, and finally output by the rim connecting member 140. After speed reduction via the primary speed-reducing component and the secondary speed-reducing component, the output speed of the rim connecting member 140 can meet requirements.

Since the power system according to the embodiment of the present disclosure is provided with the foregoing speed reducer 100, the power system is more stable in operation, more stable in transmission and longer in service life.

A straddle-type rail train according to an embodiment of the present disclosure is briefly described below.

The straddle-type rail train according to the embodiment of the present disclosure includes the power system in the foregoing embodiment. Since the straddle-type rail train according to the embodiment of the present disclosure is provided with the foregoing power system, the straddle-type rail train is more stable in operation and safer to drive.

A rail transport system according to an embodiment of the present disclosure is briefly described below.

The rail transport system according to the embodiment of the present disclosure includes the straddle-type rail train in the foregoing embodiment. Since the rail transport system according to the embodiment of the present disclosure is provided with the foregoing straddle-type rail train, the rail transport system is more stable, and can effectively protect the personal safety of passengers.

In the descriptions of this specification, descriptions such as reference terms "an embodiment", "some embodiments", "example", "specific example", or "some examples" intend to indicate that specific features, structures, materials, or characteristics described with reference to embodiments or examples are included in at least one embodiment or example of the present disclosure. In this specification, schematic descriptions of the foregoing terms do not need to aim at a same embodiment or example. Besides, the specific features, the structures, the materials or the characteristics that are described may be combined in a proper manner in any one or more embodiments or examples. In addition, in a case that is not mutually contradictory, persons skilled in the art can combine or group different embodiments or examples that are described in this specification and features of the different embodiments or examples.

Although the embodiments of the present disclosure are shown and described above, it may be understood that the foregoing embodiments are examples, and cannot be understood as limitations to the present disclosure. A person of ordinary skill in the art may make changes, modifications, replacements, and variations to the foregoing embodiments without departing from the scope of the present disclosure.

What is claimed is:

1. A speed reducer, comprising:
a box body;
a speed-reducing mechanism, disposed in the box body; and
a support shaft, a first end of the support shaft being supported on the box body, and a second end of the support shaft being connected to a higher speed end of two ends of the speed-reducing mechanism, wherein:
the speed-reducing mechanism comprises a primary speed-reducing component and a secondary speed-reducing component,
the primary speed-reducing component is connected to the second end of the support shaft,
the secondary speed-reducing component is connected to a rim connecting member,
the primary speed-reducing component comprises a primary speed-reducing driving gear and a primary speed-reducing driven gear,
the primary speed-reducing driving gear is connected to the second end of the support shaft, and
the primary speed-reducing driven gear is meshed with the primary speed-reducing driving gear.

2. The speed reducer according to claim 1, wherein
the secondary speed-reducing component comprises a secondary speed-reducing driving gear and a secondary speed-reducing driven gear,
the secondary speed-reducing driving gear and the primary speed-reducing driven gear are coaxially fixed,
the secondary speed-reducing driven gear is meshed with the secondary speed-reducing driving gear, and
the secondary speed-reducing driven gear being connected to the rim connecting member.

3. The speed reducer according to claim 2, wherein the secondary speed-reducing driven gear is a ring gear, and the secondary speed-reducing driven gear and the rim connecting member are coaxially fixed.

4. The speed reducer according to claim 1, wherein there is a plurality of primary speed-reducing driven gears supported on the box body.

5. The speed reducer according to claim 1, wherein the box body comprises: a housing portion and a sleeve portion, the sleeve portion being disposed in the housing portion.

6. The speed reducer according to claim 5, wherein the primary speed-reducing driven gear is supported between the housing portion and the sleeve portion through a first bearing set.

7. The speed reducer according to claim 6, wherein the rim connecting member is supported on the sleeve portion through a second bearing set.

8. The speed reducer according to claim 7, wherein the first end of the support shaft is supported on the sleeve portion through a third bearing set.

9. The speed reducer according to claim 5, wherein the box body further comprises: an end cover, disposed on an end face of the rim connecting member.

10. The speed reducer according to claim 5, wherein the box body further comprises: an oil seal, disposed on the housing portion and used to seal a gap between the housing portion and the rim connecting member.

11. A power system, comprising:
   a speed reducer having:
      a box body;
      a speed-reducing mechanism, disposed in the box body; and
      a support shaft, a first end of the support shaft being supported on the box body, and a second end of the support shaft being connected to a higher speed end of two ends of the speed-reducing mechanism,
   a motor, disposed on the box body and provided with a motor shaft, the motor shaft being connected to the second end of the support shaft; and
   a brake, the motor being connected to the speed reducer, and the brake being mounted on the motor and in driving connection with the motor, wherein:
   an end face of the second end of the support shaft is depressed inward to form a spline groove,
   the motor shaft stretches into the spline groove to be meshed with the second end of the support shaft, and
   a peripheral surface of the second end of the support shaft is meshed with the higher speed end of the two ends of the speed-reducing mechanism, or a peripheral surface of the second end of the support shaft is fixed to the higher speed end of the two ends of the speed-reducing mechanism.

12. A straddle-type rail train, comprising the power system according to claim 11.

13. A rail transport system, comprising the straddle-type rail train according to claim 12.

* * * * *